(12) United States Patent
Moruzzi

(10) Patent No.: US 8,439,326 B2
(45) Date of Patent: May 14, 2013

(54) SAFETY TETHER FOR PIPE END PREP TOOL

(75) Inventor: James A. Moruzzi, Sherborn, MA (US)

(73) Assignee: ESCO Tool, Holliston, MA (US)

( * ) Notice: Subject to any disclaimer, the term of this patent is extended or adjusted under 35 U.S.C. 154(b) by 222 days.

(21) Appl. No.: 13/097,780

(22) Filed: Apr. 29, 2011

(65) Prior Publication Data

US 2012/0273647 A1 Nov. 1, 2012

(51) Int. Cl.
*F16M 13/00* (2006.01)
(52) U.S. Cl.
USPC ......... 248/573; 248/693; 248/610; 294/82.16
(58) Field of Classification Search ................... 248/693, 248/548, 573, 610, 658, 317; 254/10.5; 294/81.1, 294/82.16
See application file for complete search history.

(56) References Cited

U.S. PATENT DOCUMENTS

| 1,281,128 | A | * | 10/1918 | Borer | 248/610 |
| 3,291,249 | A | * | 12/1966 | Bays | 181/114 |
| 3,721,436 | A | * | 3/1973 | Barthel, Jr. | 482/69 |
| 3,761,082 | A | * | 9/1973 | Barthel, Jr. | 482/69 |
| 4,076,313 | A | * | 2/1978 | Sperandeo, III | 299/8 |
| 4,542,928 | A | * | 9/1985 | Fowler, Jr. | 294/81.1 |
| 4,595,402 | A | * | 6/1986 | Silletto et al. | 55/378 |
| 4,723,805 | A | * | 2/1988 | Bates et al. | 294/82.16 |
| 4,813,985 | A | * | 3/1989 | Brennecke et al. | 55/378 |
| 5,395,523 | A | * | 3/1995 | Oka et al. | 210/225 |
| 6,557,828 | B2 | * | 5/2003 | Yamamoto | 254/344 |

* cited by examiner

*Primary Examiner* — Bradley Duckworth
(74) *Attorney, Agent, or Firm* — Renner, Kenner, Greive, Bobak, Taylor & Weber

(57) ABSTRACT

A safety tether is provided for securing a heavy work tool. The safety tether includes one or more springs that serve to carry some of the weight of the work tool. A safety chain is provided in parallel connection with the springs. The length of the chain is less than the extended length of a spring at its maximum rated load, thus precluding extension of the springs to that link, greatly reducing any likelihood that the springs will break. In the event of spring breakage, the chain serves as a safety chain, stopping the tool from falling.

9 Claims, 3 Drawing Sheets

SAFETY TETHER FOR PIPE END PREP TOOL

TECHNICAL FIELD

The invention herein resides in the art of work tool safety mechanisms and, more particularly, to a safety device for use with heavy manually manipulated tools. Specifically, the invention relates to a spring loaded tether having a safety chain associated therewith to prevent the associated tool from falling, while still accommodating the movement and manipulation of the tool itself.

BACKGROUND ART

In many industrial environments, heavy equipment requires manual manipulation and operation on a workpiece. By way of example, but not limitation, tools used for fitting, preparing, and repairing large pipes in any of a variety of environments are typically manually operated by individuals and, because of their weight, operating torque, and the like, are occasionally given to disengagement from the workpiece, with the result being an extremely heavy piece of equipment dropping to the floor or ground. This becomes extremely dangerous to personnel and hazardous to the equipment itself, particularly when working with heavy equipment in overhead locations. One particular type of equipment for which such problems exist is a pipe end prep tool, which may weigh in excess of 600 lbs., and which typically requires the clamping of the tool to the inside diameter or circumference of a pipe, while milling blades operate on the end of the tool to dress and finish it for coupling or fitting it to another pipe or repair piece.

When clamping a pipe end prep tool to the inside diameter or circumference of a pipe, it is necessary for the tool to center on the pipe inside diameter in order to ensure that the preparation and finishing of the pipe end is square to the pipe outside diameter. In order to accomplish this, it is necessary that the operator be able to shake or rock the pipe end pre tool to ensure that the internal clamps expand in a uniform manner as they move up on a tapered mandrel and engage the inside pipe diameter or circumference. If it is not possible to shake or rock the pipe end prep tool as the clamps tighten on the pipe internally, the tool could easily be cocked off center or at an angle with the end result being a preparation of the end of the pipe that is not square to the pipe outside diameter.

While smaller tools, which are generally lighter and easier to handle, allow the operator to simply shake or rock them as the clamps engage the interior of the pipe, heavier pipe end prep tools, which may weigh over 600 lbs., render such shaking and rocking impractical, if not impossible. To overcome this problem, the art has employed drawbar springs to offset the weight of the pipe end prep tool and allow the operator to shake or rock it easily. The drawbar springs, attached at a fixed location above the tool and connected to the tool, support a significant portion of the weight of the tool and give the operator the perceptible feel of the pipe end prep tool squaring itself to the outside diameter as the clamps move up the tapered mandrel and tighten to the inside diameter of the pipe.

While drawbar springs do facilitate the handling and manipulation of such heavy tools, they have been found to break and come apart if the springs are allowed to bottom out by extending to their maximum load limit. The braking of a spring or springs results in the pipe end prep tool unexpectedly dropping, risking injury to personnel, other equipment, and the tool itself.

DISCLOSURE OF INVENTION

In light of the foregoing, it is a first aspect of the invention to provide a safety tether for pipe end prep tools in which a safety chain prevents the drawbar springs from bottoming out.

Another aspect of the invention is the provision of a safety tether for pipe end prep tools in which a safety chain is provided in parallel relationship to the drawbar springs and in which the safety chain is provided with a load rating capacity several times that of the weight of the prep tool itself.

Still a further aspect of the invention is the provision of a safety tether for pipe end prep tools that ensures that a safety chain is locked between the prep tool and an otherwise fixed support member in a manner that does not compromise the integrity of the chain.

The foregoing and other aspect of the invention that will become apparent as the detailed description proceeds are achieved by a safety tether for connection to a tool, comprising: first and second end brackets; at least one expandable spring having a characteristic maximum load rating and interconnected between said first and second end brackets; and a safety chain interconnected between said first and second end brackets in parallel with said at least one spring, said chain having an extended length less than a length of said at least one spring when extended to a predetermined limit.

Other aspects of the invention that will become apparent herein are achieved by the combination of a tool and safety tether, comprising: a tool; a first end bracket secured to said tool; a second end bracket secured to a stationary member; at least one weight bearing spring extending between said first and second end brackets; and a tether extending between said first and second end brackets in parallel with said weight bearing spring, said tether being of a length less than a characteristic extended length of said weight bearing spring at a maximum load bearing extension of said weight bearing spring.

DESCRIPTION OF DRAWINGS

For a complete understanding of the various aspects, structures and techniques of the invention, reference should be made to the following detailed description and accompanying drawings wherein.

BEST MODE FOR CARRYING OUT THE INVENTION

It will be appreciated that the invention herein is described with regard to implementation with a pipe end prep tool. Those skilled in the art will, however, appreciate that the safety tether of the invention is adaptable to implementation with any of a wide variety of tools.

Figure 1:
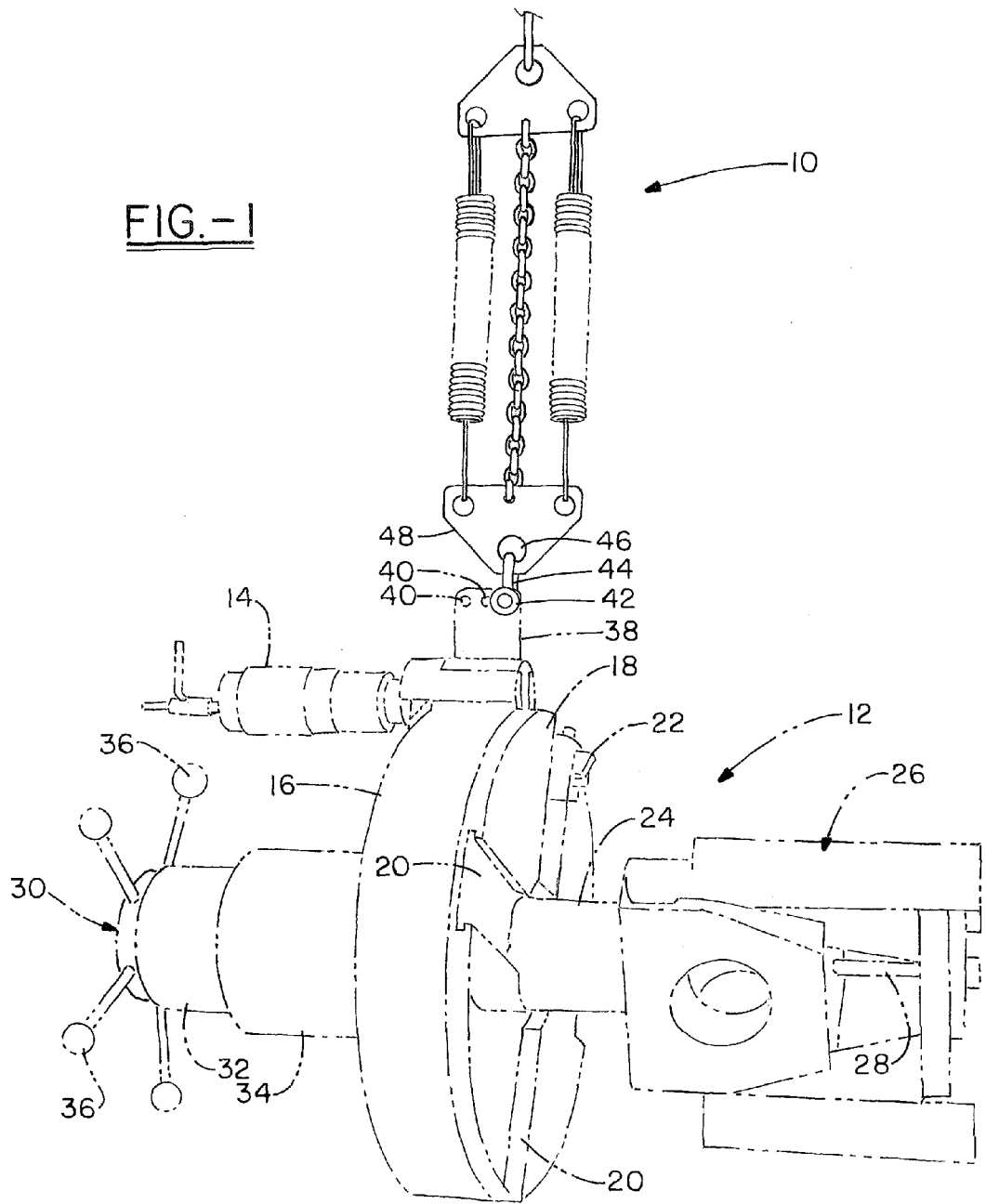
FIG. 1 is a perspective illustration of the safety tether of the invention shown in interconnection with a pipe end prep tool.

Referring now to the drawings and more particularly FIG. 1, it can be seen that a safety tether made in accordance with the invention is designated generally by the numeral 10 and is shown in interconnection with a pipe end prep tool 12. Those skilled in the art will appreciate that the pipe end prep tool 12 is secured by a mandrel internally to a pipe such that a cutting blade or blades may operate on the end of the pipe to cut, dress or finish the exposed end about an outside diameter or circumference thereof. In that regard, an air motor 14 is provided in interconnection with a gearbox or housing 16 to drive internal gears to rotate a cutting plate 18. The cutting plate 18 is characterized by a plurality (here 4) of uniformly spaced key ways 20, each of the key ways being configured to receive a cutting blade 22. The cutting blades 22 are selectively positionable within the key ways 20 to engage the outer circumference, about the outside diameter, of a pipe upon which the tool is working.

A stationary mandrel 24 extends from the housing 16 and has expandable clamps 26 at an end thereof adapted for engaging the inner diameter or circumference of the pipe. The clamps 26 are expanded by rotation of a bolt on a threaded rod 28 that engages the expandable clamp 26 and is actuated by a wrench or the like on a bolt head (not shown) at the opposite end 30 of the rod or bolt 28. Once mounted to the pipe by means of the internal expandable clamp 26, a feed cylinder 32, received within an outer sleeve 34, may be driven by rotation through feed cylinder arms 36 to drive the cutting plate 18, carrying the blades 22 into cutting engagement with the end of the pipe to which the clamp 26 is secured.

It will be appreciated that a single operator is typically manipulating and maneuvering the pipe end prep tool 12. To begin, the worker inserts the retracted clamp 26 into the inside diameter of the pipe and rocks and shakes the tool 12 as the clamp 26 is expanded by rotation of a draw rod nut on the threaded rod 28, to ensure a squared engagement with the pipe itself. Once so secured, the air motor 14 is actuated to rotate the cutting plate 18, carrying the cutting blades 22. The operator moves the cutting plate 18 axially by rotation of the feed cylinder arms 36. Because of the great weight of the tool 12, a safety tether 10 with drawbar springs is employed to relieve much of the weight of the tool itself and provide a safety mechanism in the event a spring should break. To this end, a bracket 38 is welded or otherwise secured to the housing 16. The bracket 38 is provided with a plurality of holes, three being shown, for selective positioning of a pin 42. The pin 42 secures a loop 44, which passes through a hole 46 in a bottom end bracket 48 of the safety tether 10. It will be appreciated that the provision of multiple holes 40 in the bracket 38 allows for selective positioning of the pin 42, which, in operation, serves as a pivot point for the operation of the tool 12.

Figure 2:
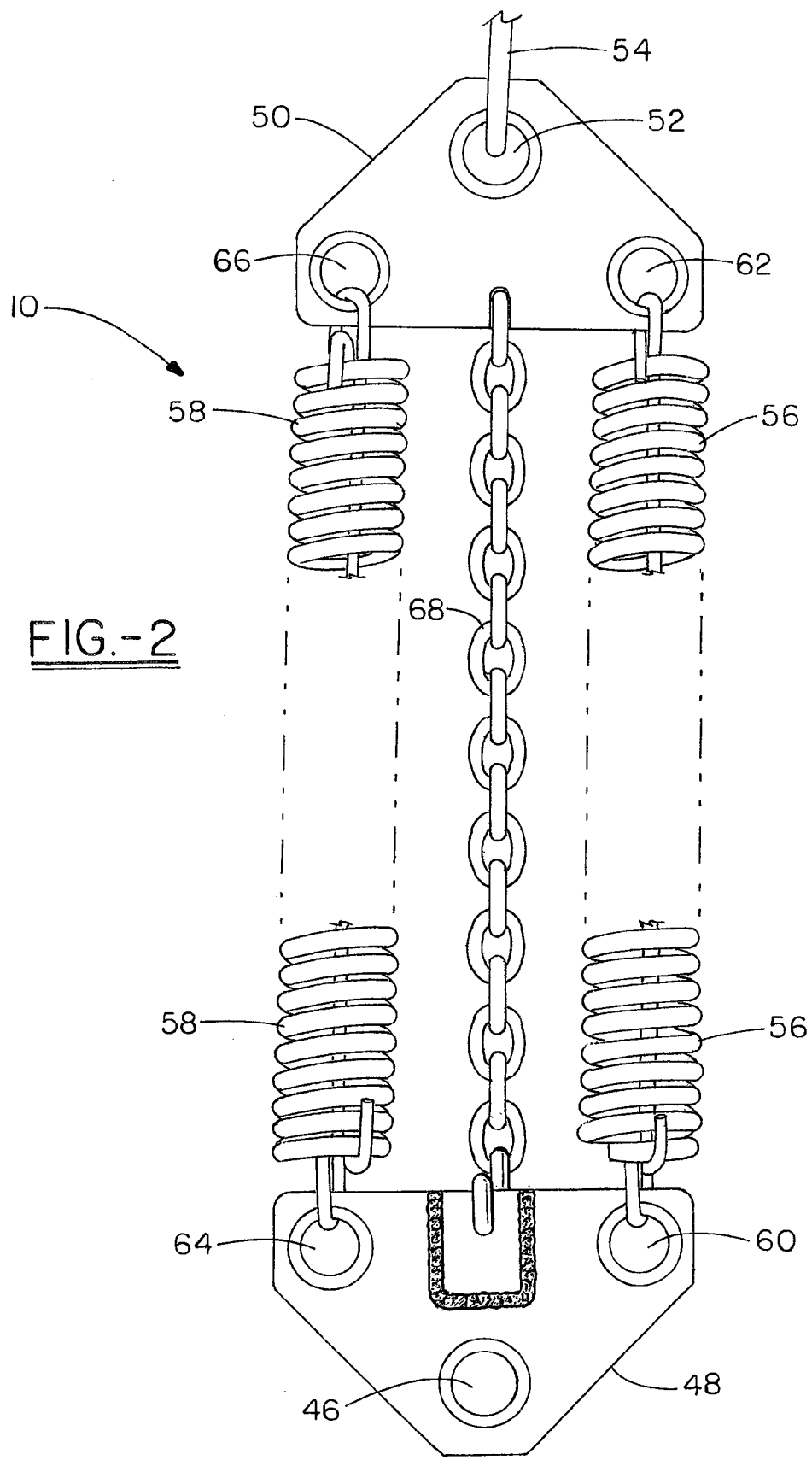
FIG. 2 is a detailed illustration of the safety tether of FIG. 1.

With reference now to FIG. 2, it can be seen that the safety tether 10 has a top end bracket 50 spaced from the bottom end bracket 48, the top end bracket 50 having a hole 52 passing therethrough for receiving a support chain, hook or the like 54, which is used to secure the safety tether 10 at that end to an overhead crane, forklift, block and tackle, or the like. Any suitable member of sufficient strength to support the heavy tool 12 during operation is sufficient.

A pair of springs 56, 58 extend between respective receiving holes 60, 62 and 64, 66 in the brackets 48, 50 as shown. A safety chain 68 is secured between the end brackets 48, 50 as shown. The safety chain 68 is a link chain, having a length between its secured points that is greater than the contracted length of the springs 56, 58 and less than the extended length of the springs 56, 58 at their rated maximum load capacity. Accordingly, the chain 68 does not interfere with acceptable operable extension of the springs, but precludes the springs 56, 58 from ever being extended to or beyond their rated maximum load capacity, thus greatly reducing any likelihood of spring breakage. Moreover, in the unlikely event that a spring 56, 58 might break, the chain 68 has a load bearing capacity of 4-6 times the maximum weight of any tool intended for use with the tether 10. Accordingly a significant safety factor characterizes the tether 10.

It has been found to be beneficial that none of the links of the chain 58 are cut, bent, or welded, since the same has often been found to reduce the load bearing capability of the links. Accordingly the chain 68 is interconnected between the end brackets 48, 50 in a manner by which the chain is clamped to the brackets, without any mechanical degradation of any of the links themselves.

Figure 3:
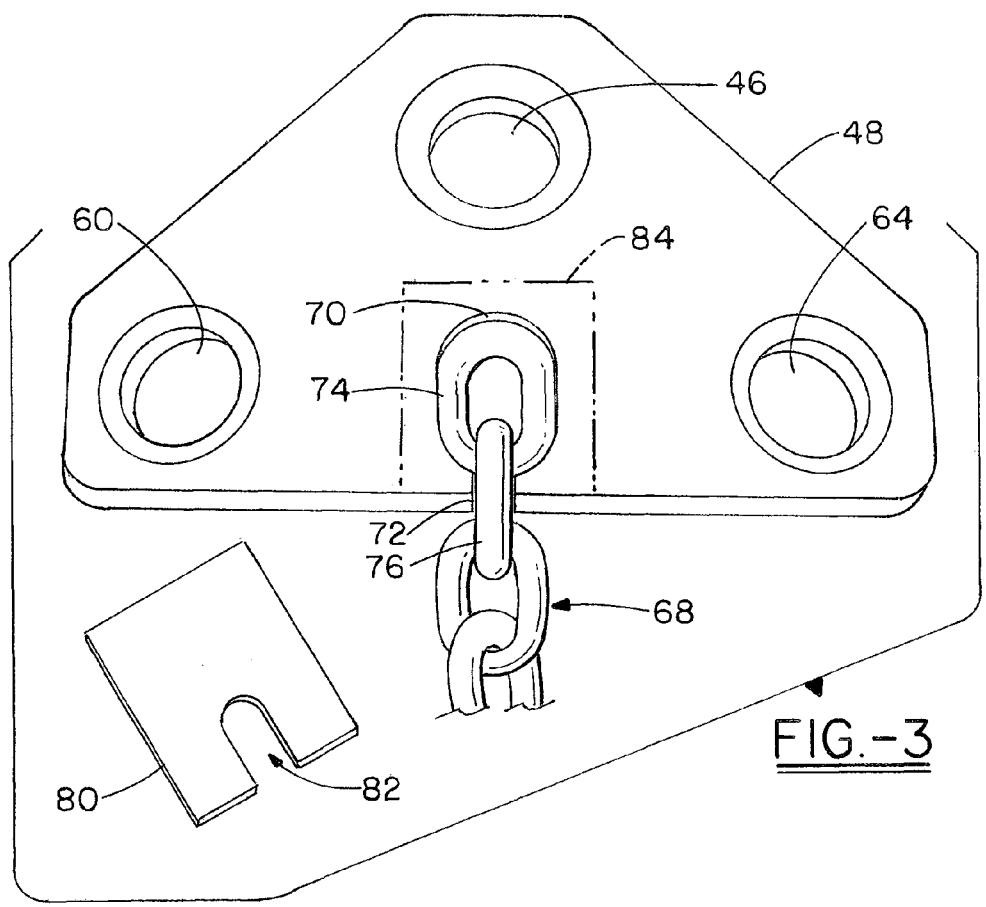
FIG. 3 is a perspective view of one of the end brackets of the safety tether of the invention, showing the chain retainer plate removed therefrom.
Figure 4:
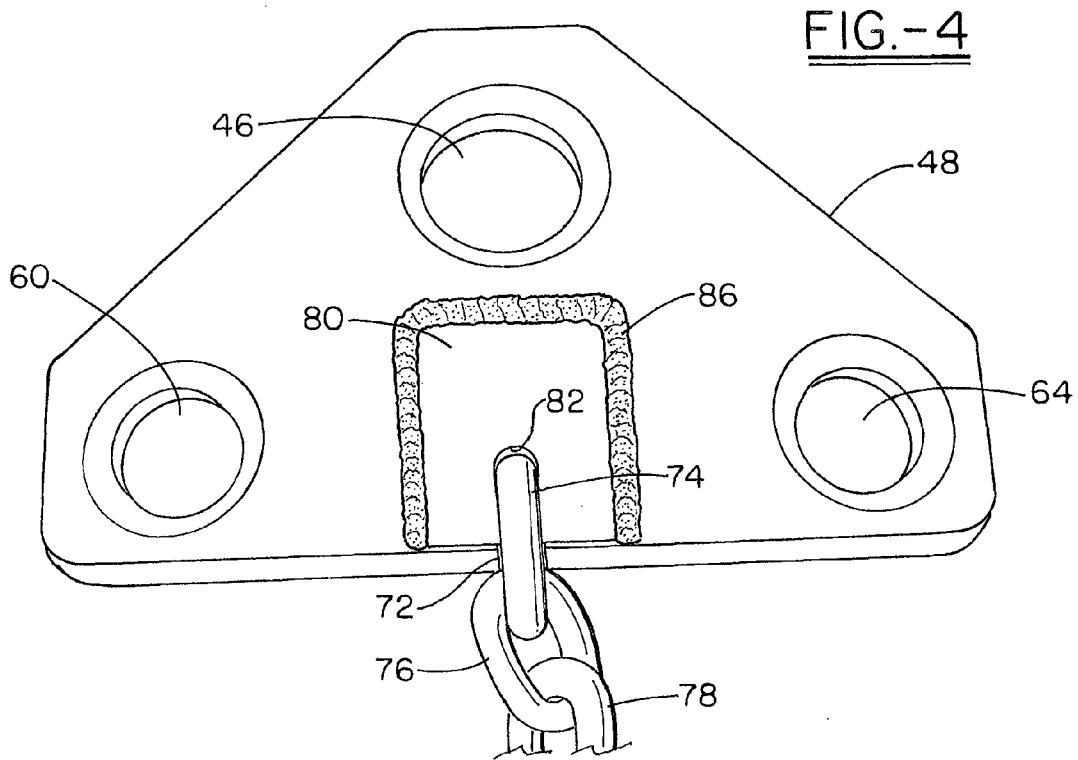
FIG. 4 is a perspective view of the end bracket of FIG. 3 showing the chain retainer plate welded in place.

With reference now to FIG. 3, an appreciation can be obtained of the method and structure by which the chain 68 is interconnected to the brackets 48, 50. While the illustration is shown with regard to the bracket 48, it will be appreciated that the same method of attachment pertains to the bracket 50. It will be appreciated that the bracket 48 is formed from a metal plate. A cavity 70 is milled into a top surface of the plate in the configuration of a chain link, and of a depth that is substantially the thickness of the chain link. The depth of the cavity 70 is such that a chain link may be laid therein with the top surface thereof not extending beyond the top surface of the plate 48. A chain link slot 72, of a width substantially corresponding to the thickness of a chain link, is milled through the plate 48 and into the cavity 70. The length of the slot 72 is sufficient to receive a portion of a chain link while allowing a sufficient portion of that link to extend from the slot to receive a succeeding link, without the succeeding link interfering with the end bracket 48. As shown, an end link 74 is received within the cavity 70, with the top surface thereof being beneath the top surface of the end plate 48. The next link 76, which is necessarily in a plane substantially perpendicular to the plane of the link 74, passes through the slot 72 and extends beneath the bottom edge of the end plate 48, as shown. The next link 78, oriented as the link 74 and substantially perpendicular to the link 76, is the first link totally external to the end bracket 48. With the link 76 extending sufficiently beyond the edge of the bracket 48, the link 78 is allowed to freely move within its engagement with the link 76.

A chain retainer plate 80 is characterized by a slot 82 extending from an edge thereof. The slot 82 corresponds with the slot 72 extending inwardly from the edge of the end bracket 48. The slot 72 allows the chain retainer plate 80 to be positioned over the cavity 70 within the phantom line 84, while allowing the chain link 76 to be received by the slot 82. With the chain retainer plate 80 so positioned, a weldment 86 may be formed about the periphery of the chain retainer plate 80, securing it to, and rendering it substantially integral with, the end plate 48.

With the chain 68 secured to the end plates 48, 50 as just described, it will be appreciated that the chains are clamped to the end plates by means of the weldment 86 securing the chain retainer plate 80 over the link 74 contained within the cavity 70. None of the links of the chain 68 have been cut, abraded, welded or mechanically disturbed. Accordingly, the integrity of the chain 68 is ensured, With the structure just described, a single operator may employ the safety tether 10, secured at one end to a relatively fixed structure such as an overhead crane or the like, while securing at the other end to a heavy work tool. The positioning of the work tool is adaptable by virtue of the plurality of holes 40 in the bracket 38 to accommodate ease of worker use. With the chain 68 being of a length less than the extended length of the springs 56, 58 at their maximum rated load, the springs are precluded from reaching that load, thus greatly reducing any likelihood of spring breakage. Should a spring break, the safety chain 68 precludes the tool from falling.

Thus it can be seen that the various aspects of the invention have been satisfied by the structure presented and described herein. While in accordance with the patent statutes only the best known and preferred embodiment of the invention has been presented and described in detail, the invention is not limited thereto or thereby. Accordingly, for an appreciation of the scope and breadth of the invention reference should be made to the following claims.

What is claimed is:

1. A safety tether, comprising:
    first and second end brackets;
    at least one expandable spring having a characteristic maximum load rating and interconnected between said first and second end brackets;
    a safety chain interconnected between said first and second end brackets in parallel with said at least one spring, said chain having an extended length less than a length of said at least one spring when extended to a predetermined limit correlated with said characteristic maximum load rating of said at least one spring; and
    wherein said chain comprises a plurality of interconnected links, an end link at each end of said chain being captured by one of said first and second end brackets, and each of said end brackets has a cavity therein receiving an associated said end link, said cavity interconnecting with a first slot to an edge of said end bracket.

2. The safety tether according to claim 1, wherein said first end bracket has an aperture to accommodate secured engagement to a tool, and said second end bracket has an aperture to accommodate secured engagement to an elevated support member.

3. The safety tether according to claim 1, further comprising a chain retainer plate welded to said associated end bracket over said cavity, thereby capturing said end link within said cavity.

4. The safety tether according to claim 3, wherein said chain retainer plate has a second slot therein extending from an edge of said chain retainer plate, said first and second slots being in alignment and receiving a second link of said chain extending from said end link, said second link passing through said slots and beyond an edge of said associated end bracket.

5. The safety tether according to claim 4, wherein said second link passes sufficiently beyond said edge of said associated bracket to receive a third link without interference with said associated bracket.

6. The combination of a tool and safety tether, comprising:
    a tool;
    a first end bracket secured to said tool;
    a second end bracket secured to a stationary member;
    at least one weight bearing spring extending between said first and second end brackets; and
    a tether extending between said first and second end brackets in parallel with said weight bearing spring, said tether being of a length less than a characteristic extended length of said weight bearing spring at a maximum load bearing extension of said weight bearing spring, and wherein said tether is securely received by said first and second end brackets at opposite ends thereof, said tether being a link chain, an end link at each end of said chain being captured by a respective one of said end brackets, and each said end bracket having a cavity therein receiving said end link, said cavity being capped by a chain retainer plate.

7. The combination according to claim 6, wherein said tool has an attachment bracket with apertures therein for secured attachment to said first end bracket.

8. The combination according to claim 6, wherein said end brackets and chain retainer plates have slots passing through edges thereof and into communication with an associated said cavity, said slots receiving a second link from an associated end of said chain.

9. The combination according to claim 8, wherein the links of said chain are not cut, abraded, welded or mechanically disturbed.

* * * * *